R. L. MUNSON.
COLLAPSIBLE WHEEL FLANGE.
APPLICATION FILED NOV. 23, 1916.
1,221,574. Patented Apr. 3, 1917.
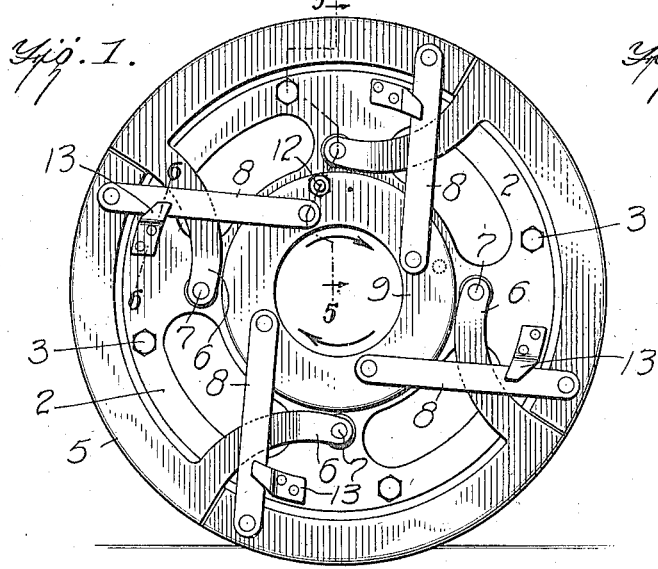
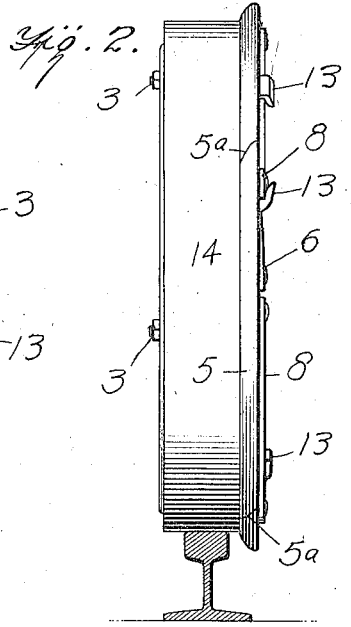
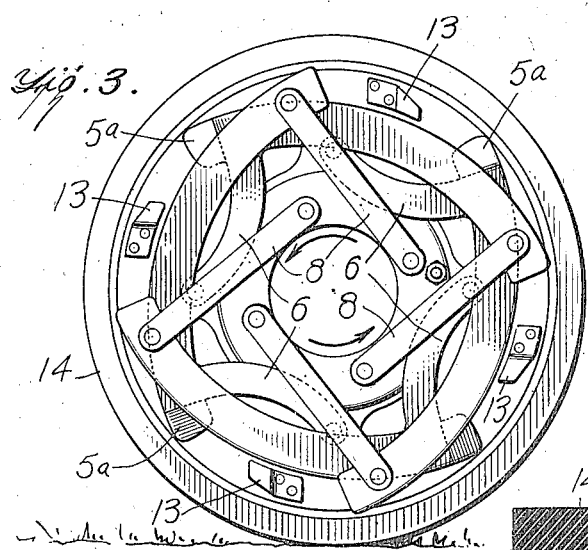
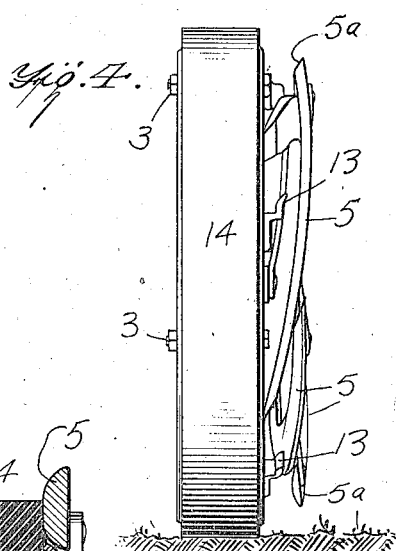
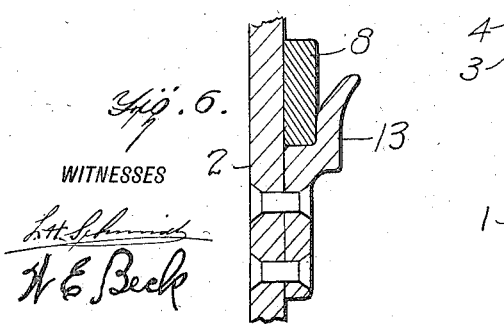
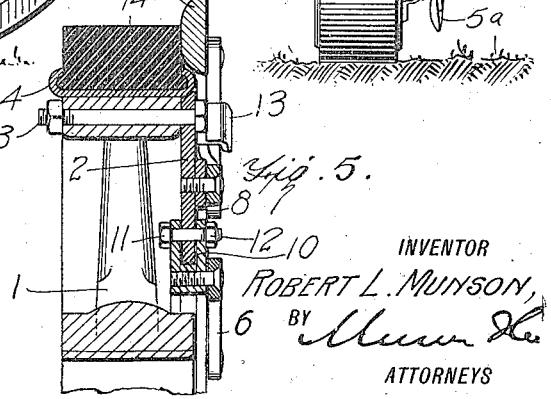
WITNESSES
INVENTOR
ROBERT L. MUNSON,
BY
ATTORNEYS

UNITED STATES PATENT OFFICE.

ROBERT L. MUNSON, OF DETROIT, MICHIGAN.

COLLAPSIBLE WHEEL-FLANGE.

1,221,574.  Specification of Letters Patent.  Patented Apr. 3, 1917.

Application filed November 23, 1916. Serial No. 133,043.

*To all whom it may concern:*

Be it known that I, ROBERT L. MUNSON, a citizen of the United States, and a resident of Detroit, in the county of Wayne and State of Michigan, have invented an Improvement in Collapsible Wheel-Flanges, of which the following is a specification.

My invention is an improvement in collapsible wheel flanges, and has for its object to provide a device of the character specified, intended for attachment to wheels of motor or other vehicles, wherein the flange is sectional, and is supported on the wheel in such manner that it may be collapsed within the periphery of the wheel, when the wheel is on the road, and which may be expanded beyond the periphery to permit the wheel to be used upon rails.

In the drawings:

Figure 1 is a side view of a wheel provided with the improved flange, with the flange expanded.

Fig. 2 is an edge view of the wheel.

Fig. 3 is a side view with the flange contracted.

Fig. 4 is an edge view of the same.

Figs. 5 and 6 are sections on the line 5—5 and 6—6, respectively, of Fig. 1, Fig. 5 looking in the direction of the arrows adjacent to the line.

In the present embodiment of the invention the wheel 1, which may be of any usual or desired construction, has secured thereto a disk or annular frame 2, by means of bolts and nuts 3, the bolts being passed through registering openings in the frame and in the rim of the wheel, with the frame on the inner side of the wheel, and the frame is of such diameter that the peripheral edge thereof will be at the metal rim 4 of the wheel.

The flange consists of four similar sections 5, each of which is a quadrant, and one end of each flange section has integral therewith a curved arm 6, and the said arm is pivoted to the frame 2 as indicated at 7. These arms 6 curve in the same direction and are similarly placed, each having its convex edge toward the flange section. The ends of the flange sections are beveled as shown at 5ª, to permit them to lap upon each other, and when in the expanded condition shown in Fig. 1 the said flange sections form a perfect circle.

A link 8 is pivoted to the opposite end of each flange section from the curved arm 6, and the inner end of each link is pivotally connected to a ring 9 which is mounted to rotate on the frame, being arranged coaxial with the wheel. This ring as shown more particularly in Fig. 5 has an annular peripheral groove 10 for receiving the inner edge of the frame 2, and the ring is thus rotatably connected with the frame. The ring is provided with an opening which is adapted to register with the openings in the frame 2, when the flange is in expanded or contracted position, and these openings are adapted to receive a bolt 11, which is engaged by a nut 12, to fix the ring with respect to the frame, and to hold the flange expanded or contracted. It will be obvious that when the ring is rotated with respect to the frame, the flange sections will be moved outwardly or inwardly, swinging on the curved arms 6. When the ring is rotated in the direction of the uppermost arrow in Fig. 3, the links will be pushed outward, and will push out the flange sections, which will swing on the curved arms 6, and will eventually attain the position shown in Fig. 1. At this point the link 8 of each section laps over the curved arm of the succeeding section, and each link engages beneath a locking lug 13 which is secured to the frame at this point. The locking lug holds the link firmly against the curved arm, and the link holds the curved arm firmly against the frame, so that each flange section is locked at both ends.

In use, when the wheel is on an ordinary road, the flange sections occupy the positions shown in Figs. 3 and 4, being contracted within the periphery of the tire 14. They are held in this position by means of the bolt 12, and when it is desired to run the vehicle on rails, for instance, the bolt 12 is removed, the ring 9 is oscillated, to move the sections 5 outwardly into the position in Fig. 1, and when they are in proper position another opening in the frame 2 will register with the opening in the ring 9 and the bolt 12 is inserted into these registering openings to lock the parts in the expanded condition.

I claim:

1. The combination with a wheel, of an annular frame secured to the inner face thereof, a series of flange sections each having at one end a curved arm pivoted to the frame, a link pivoted to the opposite end of each flange section, a ring rotatably connected with the frame and coaxial with the wheel, the inner ends of the links being pivoted to the ring to permit the flange to be expanded beyond the periphery of the wheel or within the periphery of the wheel, and the flange sections abutting at their ends when expanded beyond the periphery of the wheel, means for locking the flanges in either position, the ends of the flange sections being beveled to lap upon each other, a holding lug on the frame for engagement by the links when the flange sections are expanded to prevent lateral movement of the link away from the wheel, each link when in engagement with the lug lapping over the curved arm of the succeeding section.

2. The combination with a wheel, of an annular frame secured to the inner face thereof, a series of flange sections each having at one end a curved arm pivoted to the frame, a link pivoted to the opposite end of each flange section, a ring rotatably connected with the frame and coaxial with the wheel, the inner ends of the links being pivoted to the ring to permit the flange to be expanded beyond the periphery of the wheel or within the periphery of the wheel, and the flange sections abutting at their ends when expanded beyond the periphery of the wheel, means for locking the flanges in either position, the ends of the flange sections being beveled to lap upon each other.

3. The combination with a wheel, of an annular frame secured to the inner face thereof, a series of flange sections each having at one end a curved arm pivoted to the frame, a link pivoted to the opposite end of each flange section, a ring rotatably connected with the frame and coaxial with the wheel, the inner ends of the links being pivoted to the ring to permit the flange to be expanded beyond the periphery of the wheel or within the periphery of the wheel, and the flange sections abutting at their ends when expanded beyond the periphery of the wheel, and means for locking the flanges in either position.

4. The combination with a wheel, of an annular frame detachably connected to one face thereof, a series of flange sections each having at one end a lateral arm pivoted to the frame, said sections being arc shaped and forming a complete circle when abutted at their ends and a circle whose external diameter is greater than that of the wheel, a link pivoted to the opposite end of each flange section, an operating member mounted to rotate on the wheel to which the inner ends of the links are connected, for simultaneously expanding or contracting the flange, and means for holding the ring in either position.

5. The combination with a wheel, of a frame for connection therewith, a flange supported by the frame at one face of the wheel, and consisting of a series of sections forming a perfect circle of greater external diameter than the wheel when the ends of the sections abut, a connection between the sections and the frame for permitting said sections to be expanded with their ends abutting or contracted with the ends lapping, and an operating member on the wheel for expanding and contracting the sections.

6. The combination with a wheel, of a sectional flange at one face of the wheel, means for simultaneously expanding the sections beyond the wheel with their ends abutting, and for contracting the sections within the periphery of the wheel with their flanges lapping.

ROBERT L. MUNSON.